(12) United States Patent
Counts et al.

(10) Patent No.: US 7,668,691 B2
(45) Date of Patent: Feb. 23, 2010

(54) ACTIVITY CLASSIFICATION FROM ROUTE AND SENSOR-BASED METADATA

(75) Inventors: Scott J. Counts, Seattle, WA (US);
Marc A. Smith, Redmond, WA (US);
Andrew W. Jacobs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

(21) Appl. No.: 11/846,818

(22) Filed: Aug. 29, 2007

(65) Prior Publication Data

US 2009/0063099 A1 Mar. 5, 2009

(51) Int. Cl.
*G01C 9/00* (2006.01)
(52) U.S. Cl. .................. 702/150; 600/595; 707/100
(58) Field of Classification Search .............. 702/127, 702/141, 142, 149, 150, 152–154, 160, 176, 702/178; 600/587, 595; 340/990, 995.19, 340/995.21, 286.14; 701/209, 210
See application file for complete search history.

(56) References Cited

U.S. PATENT DOCUMENTS

| | | | |
|---|---|---|---|
| 6,522,266 B1 | 2/2003 | Soehren et al. | |
| 6,716,101 B1 | 4/2004 | Meadows et al. | |
| 7,099,921 B1 | 8/2006 | Engstrom et al. | |
| 7,243,134 B2 * | 7/2007 | Bruner et al. | 709/216 |
| 2004/0172403 A1 * | 9/2004 | Steele et al. | 707/100 |
| 2004/0252027 A1 | 12/2004 | Torkkola et al. | |
| 2005/0033200 A1 * | 2/2005 | Soehren et al. | 600/595 |
| 2005/0256635 A1 | 11/2005 | Gardner et al. | |
| 2007/0010720 A1 | 1/2007 | Mott | |

OTHER PUBLICATIONS

Motionbased Technologies. MotionBased Launches GPS Performance Tracking for Athletes. Aug. 4, 2004. http://www.motionbased.com/info/about/press/pdf/Aug2004.pdf.*
Stephen Marshall, et al. Mapping children's places and activities: Analysis of the local area around a primary school. http://www.casa.ucl.ac.uk/capableproject/download/UWE_marshall.pdf. Last accessed May 8, 2007.
Lin Liao, et al. Building Personal Maps from GPS Data. http://www.isi.edu/~pynadath/MOO-2005/8.pdf. Last accessed May 8, 2007.
Lin Liao, et al. Extracting Places and Activities from GPS Traces Using Hierarchical Conditional Random Fields. http://www.cs.washington.edu/ai/Mobile_Robotics/postscripts/places-ijrr-07.pdf. Last accessed May 8, 2007.
Lin Liao, et al. Location-based Activity Recognition. http://www.cs.washington.edu/homes/liaolin/Research/nips2005.pdf. Last accessed May 8, 2007.

(Continued)

*Primary Examiner*—Manuel L Barbee
(74) *Attorney, Agent, or Firm*—Lee & Hayes, PLLC

(57) ABSTRACT

Systems and methods that infer and classify user activity based in part on routing data. A storage medium can store raw data collected, and such acquired data can be subsequently be analyzed or distilled to generate abstract qualities about the raw data (e.g., velocity of user during route, level of difficulty, and the like). Various machine learning techniques, artificial intelligence methodologies, decision trees, and/or statistical methods can be employed to supply inference regarding the acquired raw data and/or the abstract qualities.

17 Claims, 10 Drawing Sheets

OTHER PUBLICATIONS

Natalia Marmasse, et al. WatchMe: communication and awareness between members of a closely-knit group. http://ttt.media.mit.edu/researchWM_ubi04.pdf. Last accessed May 8, 2007.

Ling Bao. Physical Activity Recognition from Acceleration Data under Semi-Naturalistic Conditions. Aug. 2003. http://architecture.mit.edu/house_n/documents/Bao03.pdf.

* cited by examiner

ACTIVITY CLASSIFICATION FROM ROUTE AND SENSOR-BASED METADATA

BACKGROUND

Route planning applications can typically aid users in locating points of interest, such as particular buildings, addresses, and the like. Moreover, users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be presented to the user. When zooming out, the user can glean information from the map such as location of the point of interest within a city, state, and/or country, proximity of the point of interest to major freeways, proximity of the point of interest to a specific city, and the like. In some applications, satellite images can be utilized to provide users with additional detail regarding a particular geographic location or region. For example, a prospective purchaser of a house can obtain an overhead satellite image of the house, thereby enabling the prospective purchaser to view lines of occupation, proximity of the house to other adjacent houses, and other information that may be pertinent to the user.

Furthermore, conventional computer implemented mapping applications often include route planning applications that can be employed to provide users with directions between different locations. For example, a user can specify a start point of travel and an end point of travel (e.g., beginning and ending addresses). As such, the route planning application can subsequently designate representations of roads and intersections and one or more algorithms to output a suggested route of travel. Such algorithms can output routes depending upon user-selected parameters. For instance, a commercial route planning application can include a check box to specify that the user wishes to avoid highways. Similarly, a user can inform the route planning application for traveling on a shortest route or a route that takes a least amount of time (as determined by underlying algorithms). Today, many individuals increasingly rely on route planning applications to aid them in during various activities such as leisure, sports, business, and the like.

Moreover, the Internet continues to make available ever-increasing amounts of information that can be stored in databases and accessed therefrom. Additionally, with the proliferation of portable terminals (e.g., notebook computers, cellular telephones, PDAs, smartphones and other similar communications devices), users are becoming more mobile, and hence, traceable with respect to routes taken and locations that they tend to frequent. For example, many devices are being designed with a geographic location tracking technology such as GPS for reasons of safety, finding travel destinations, and the like.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for classifying user activity based on route data (and associated sensor derived annotations/metadata) via an analysis engine. Such route data (e.g., collection of latitude/longitude/altitude) can be captured through a collection component as part of a portable device carried by a user, which employs a position identifying system (e.g., Global positioning system, triangulation techniques such as using cellular tower information, and the like), and the classification can be local to the portable device (e.g., while the device is not connected to the server)—wherein on-the-fly activity classification occurs based on route of the user.

A storage medium can store raw data collected, which is subsequently analyzed/distilled to generate abstract qualities about the raw data (e.g., velocity of user during route, level of difficulty, and the like). Various machine learning techniques, artificial intelligence methodologies, decision trees, and/or statistical methods can also be employed to supply inference regarding the acquired raw data and/or the abstract qualities.

Accordingly, users can log routes during their routines (e.g., driving, sightseeing, jogging, and the like), wherein a logging component reads data from the positioning system and outputs to a file (e.g., an XML file). An upload component can subsequently upload such data to a server, wherein the server can perform activity classification analyses on both the acquired raw data and/or abstracted qualities (e.g., velocity). Upon uploading data to a website associated inferences can be made regarding their activities. Moreover, metadata related to the activity (e.g., contextual data, physiological data, and the like) can further be uploaded to facilitate inferring the activity that users are engaged therein.

In a related aspect, classification of the route can be uploaded to a network (e.g., Internet), wherein user routes and associated data can be logged and super imposed on geographical maps, to be searchable through a variety of interfaces by other users (e.g., another user searching for a biking trail having a predetermined level of difficulty). Moreover, such collected data and activities inferred therefrom, can further be data mined for various marketing activities, such as inferring likelihood that a particular service is of interest to a user.

According to a methodology of the subject innovation, a user initially switches on or opens a routing application on a portable device, which can trace user location during the activity. Such routing application can employ a Global Positioning System (GPS) that can be built as part of the portable device or a stand alone unit. A web service can then upload the data from the portable device to a back end server, wherein abstract qualities and/or inferences are generated regarding the raw data, to classify user activity. Moreover, differences between data points can be analyzed (e.g., altitude difference) to facilitate inference regarding user activity, as well as context of user related information (e.g., location, profile, demographics, environment and the like).

According to a further aspect, detailed distinction between activities can be performed with addition of sensor for route annotations. Such can for example include sensors attached to a user's body for collection of biometric data (e.g., blood pressure, heart rate monitor, and the like), or indicate nature of the body motion. The obtained data can further distinguish between activities that manifest similar characteristics regarding location and positioning data.

To the accomplishment of the foregoing and related ends, certain illustrative aspects of the claimed subject matter are described herein in connection with the following description and the annexed drawings. These aspects are indicative of various ways in which the subject matter may be practiced, all

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
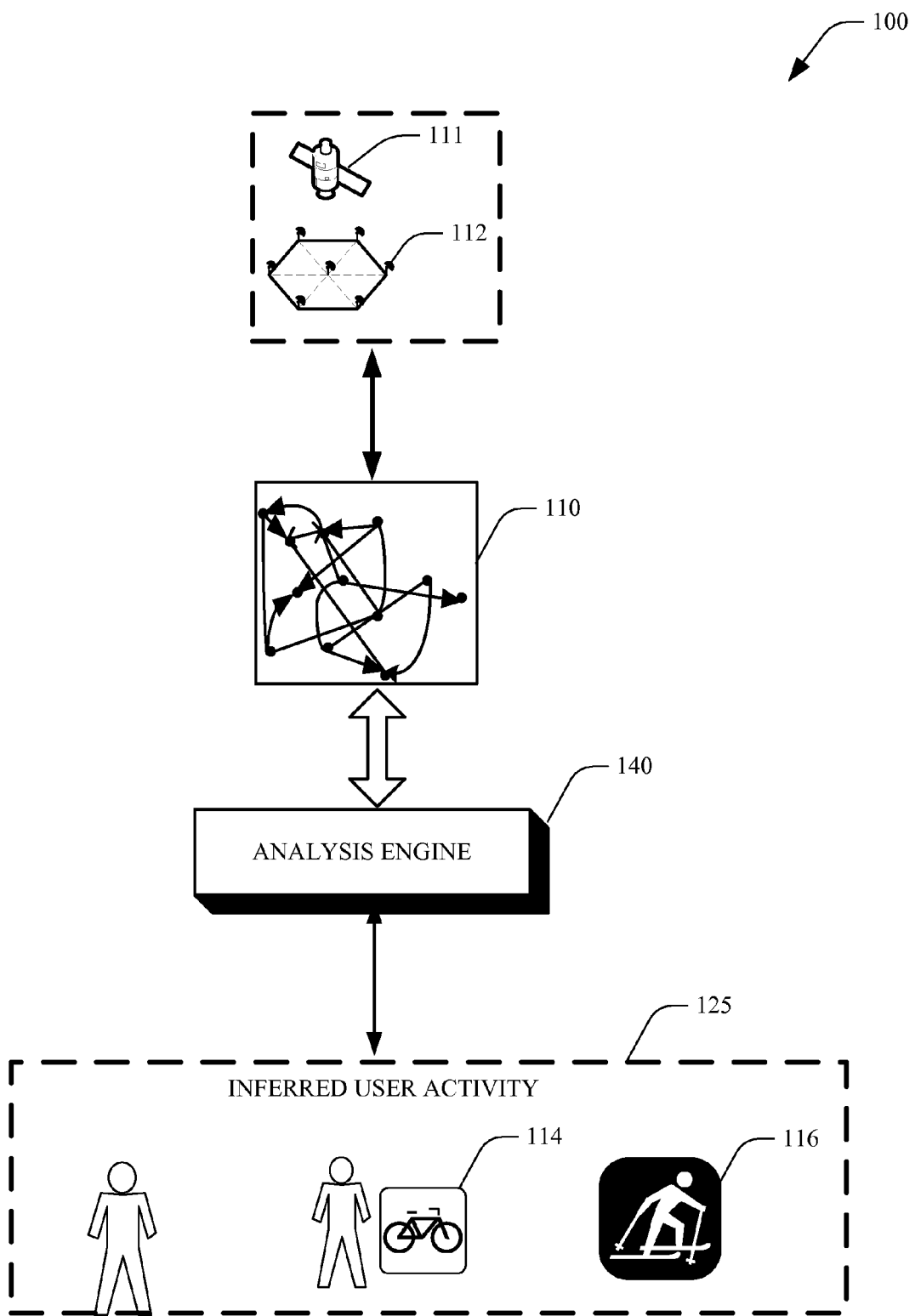
FIG. 1 illustrates a block diagram of an exemplary analysis engine that classifies user activity based on route data in accordance with an aspect of the subject innovation.

FIG. 1 illustrates a block diagram of a system 100 that infers and classifies user activity 125 based on route data 110 and associated sensor derived annotations/metadata. Such route data 110 can include location/positioning data collected during performance of an activity by a user which is transmitted via a user portable device (not shown), (e.g., data such as latitude, longitude, altitude, motion related data, velocity, acceleration, and the like), for example. The portable user device can be a hand-held wireless communication device that can communicate with a wireless communication network, (e.g. wireless communication network) to upload and download digital information, via a cellular access point and/or via a wireless access network (WLAN) access point, such as a cellular base station, mobile switching center, 802.11x router, 802.16x router and the like. Further examples of the portable user device 142 can include a cellular communication device, a multi-mode cellular device, a multi-mode cellular telephone, a dual-mode cellular device, a dual-mode cellular/WiFi telephone, or like cellular and/or combination cellular/fixed internet protocol (IP) access devices.

Based on analysis of the route data 110 the analysis engine 140 can infer the type of activity that the user has engaged in. For example, if there is a rapid and substantial decrease in elevation while the longitude and latitude position remains relatively constant, the analysis engine 140 can infer that the user is involved in an activity that requires a quick shift in elevation such as parachuting. Likewise, if there occurs a change in altitude in conjunction with changes in longitude and latitude, an inference can be made that the user is involved in an activity that results in changes in all coordinates such as skiing 116 or biking 114. The system can further increase accuracy of such inference, by considering additional metadata such as user biometrics, muscle movements, and the like, as described in detail infra.

The route data 110 can be determined via employing technologies such; as a Global Positioning System (GPS) 111, defining a cellular network via reference points with proximity detectors to evaluate distance of a unit from a reference point 112, angle and Time Difference of a Signal's Arrival (TDOA), probabilistic analysis of strength of a wireless signal with respect to the receiving reference points with proximity detectors, and the like. Such classification can be local to the user portable device (e.g., while not connected to the server)—wherein on-the-fly route classification occurs based on route activity of the user.

Figure 2:
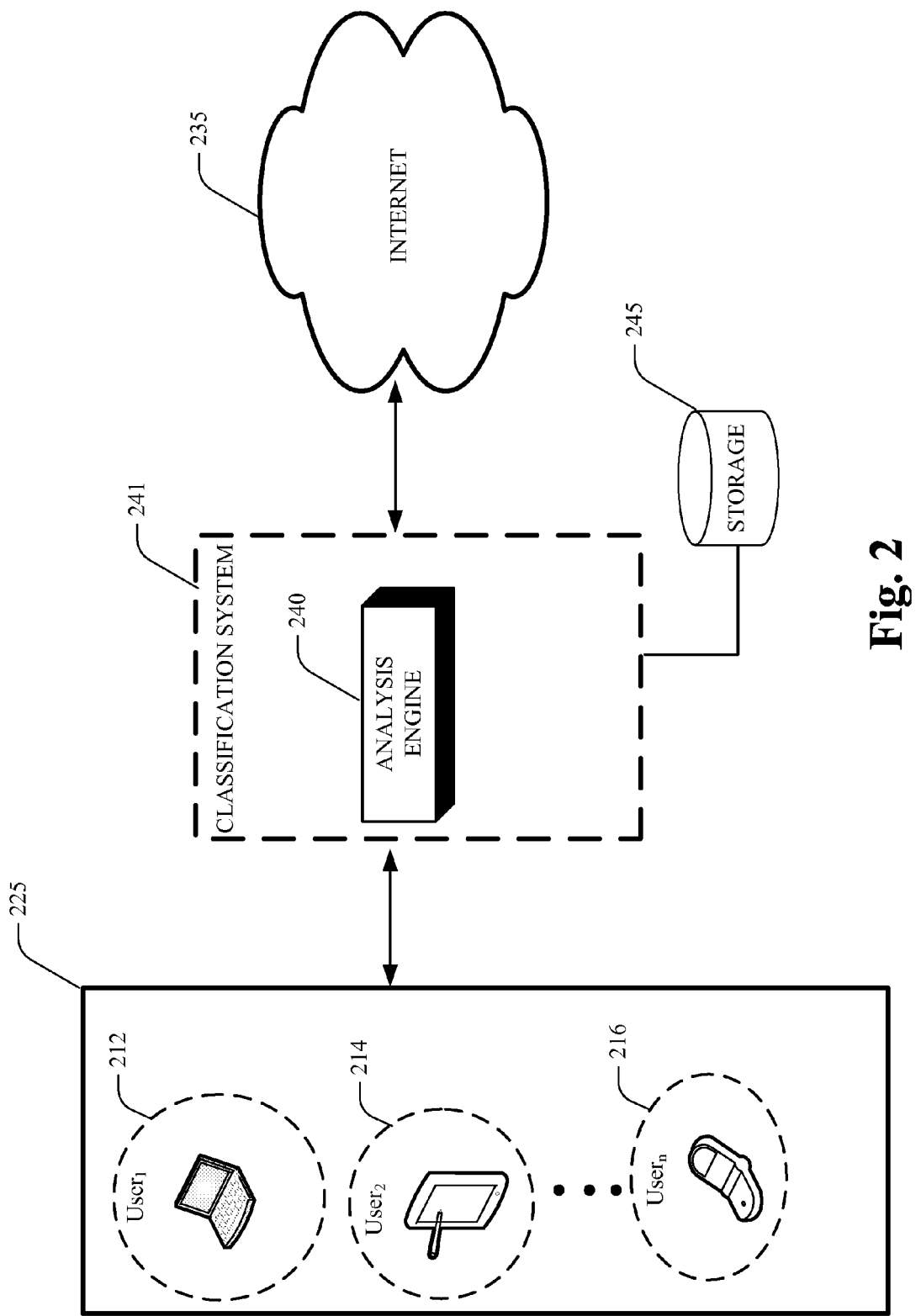
FIG. 2 illustrates a particular classification system that infers user activity based on route data.

FIG. 2 illustrates a particular classification system 241 that infers user activity based on route data that are obtained via the user portable device 212, 214, 216 (1 thru n, where n is an integer). The user portable devices 212, 214, 216 can also be part of a network (e.g., wireless network) such as a system area network to infer group activity, in addition to an individual user activity. Such network can further include several hosts, (not shown), which can be personal computers, servers or other types of computers. Such host generally can be capable of running or executing one or more application-level (or user-level) programs, as well as initiating an I/O request (e.g., I/O reads or writes). In addition, the network can be, for example, an Ethernet LAN, a token ring LAN, or a Wide Area Network (WAN). Moreover, such network can also include hardwired and/or optical and/or wireless connection paths. The connections can be shared among a plurality of the user portable devices 212, 214, 216 that can infer user activity based on route data. Such user portable devices 212, 214, 216 can further include, personal computers, workstations, televisions, telephones, and the like for example.

Moreover, the networks can further include one or more input/output units (I/O units), wherein such I/O units can include one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. As such, the analysis engine can further infer group activities for a group of users 225. A storage medium 245 can store raw data collected, and such acquired data can be subsequently analyzed/distilled to generate abstract qualities about the raw data (e.g., velocity of user during route, level of difficulty, and the like). Moreover, it is to be appreciated that many data aspects of the subject invention can be cached at various locations for faster access and processing. For example, where is it known that the user is generating activity via device communications, location information processing, and the like, some of the existing data being processed can be cached in the portable user device. Additionally, caching can occur at a website on the internet 235 that can store raw data and/or abstraction inferred therefrom. Still further, a website can be designed specifically for the purpose of enabling high-speed data processing and caching to facilitate various aspects of the subject innovation. Moreover, various machine learning techniques, artificial intelligence methodologies, decision trees, and/or statistical methods can be employed to supply inference regarding the acquired raw data and/or the abstract qualities. The acquired and stored data can further be uploaded to the internet 235, wherein other users can search the classification provided by the analysis engine 240.

For example, the analysis engine 240 can employ probabilistic models, including dynamic Bayes networks, continuous time Bayes networks, Hidden Markov models, and various time-series forecasting models to take histories and make inferences regarding user activities. Probabilistic forecasting methods employed by the analysis engine 240 can be employed to provide subsequent computation and inferences regarding user activity. As such, user routes and associated data can be logged and super imposed on geographical maps, to be searchable through a variety of interfaces by other users (e.g., another user searching for a biking trail having a predetermined level of difficulty). Moreover, such collected can further be data mined for various marketing activities, such as inferring likelihood that a particular service is of interest to a user. It is to be appreciated that the subject innovation is not limited to human beings and can further encompass tracking pets, animals in their natural habitats, and the like to infer activities from routing data.

Figure 3:
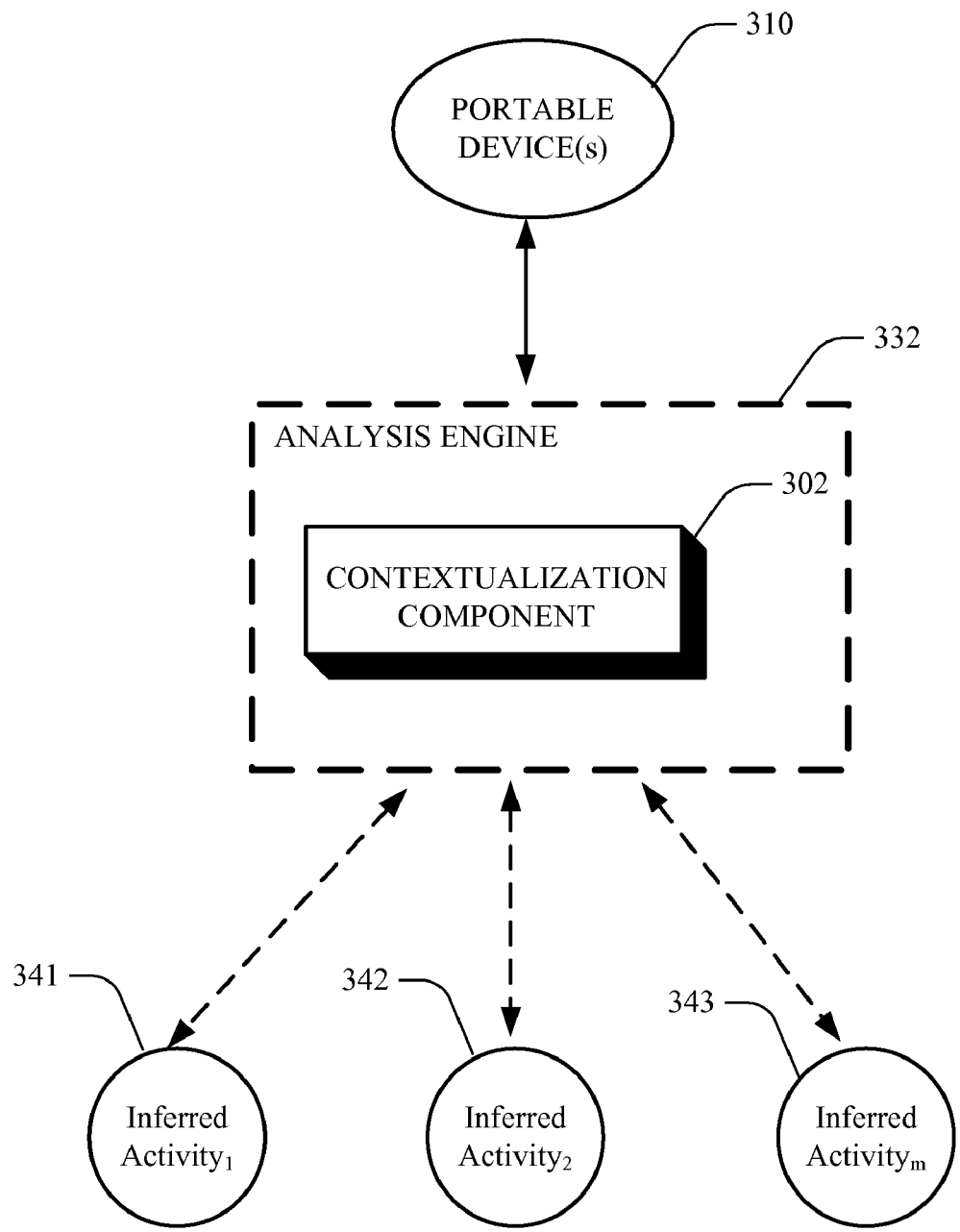
FIG. 3 illustrates a contextualization component as part of the analysis engine that infers user activity based on routing data, in accordance with a further aspect of the subject innovation.

FIG. 3 illustrates a contextualization component 302 as part of the analysis engine 332 that infers user activity based on routing data, in accordance with an aspect of the subject innovation. The contextualization component 302 can analyze contextual information related to data such as user demographics, user biometric data, current events, calendar, time of day, to facilitate inference of user activity 341, 342, 343 (1 thru m, m being an integer) from routing data acquired by a portable device carried by a user. The routing data can be obtained automatically via geographic location technologies, such as global positioning system, tracking information for portable devices carried by the customer, for example. Likewise, demographics and profile input can be collected from prior user interaction with various web services or marketing systems that can be associated with the inference system of the subject innovation. Similarly, the contextualization component 302 can employ user related information such as current user biometric data and muscle behavior and/or information that are accumulated based on user activity while in a predetermined locality (e.g. hiking outdoors, shopping behavior in retail establishments). Additionally, combination of web-based user activity and physiological activity while in the establishment can be analyzed and processed to infer a user activity based on routing data.

Figure 4:
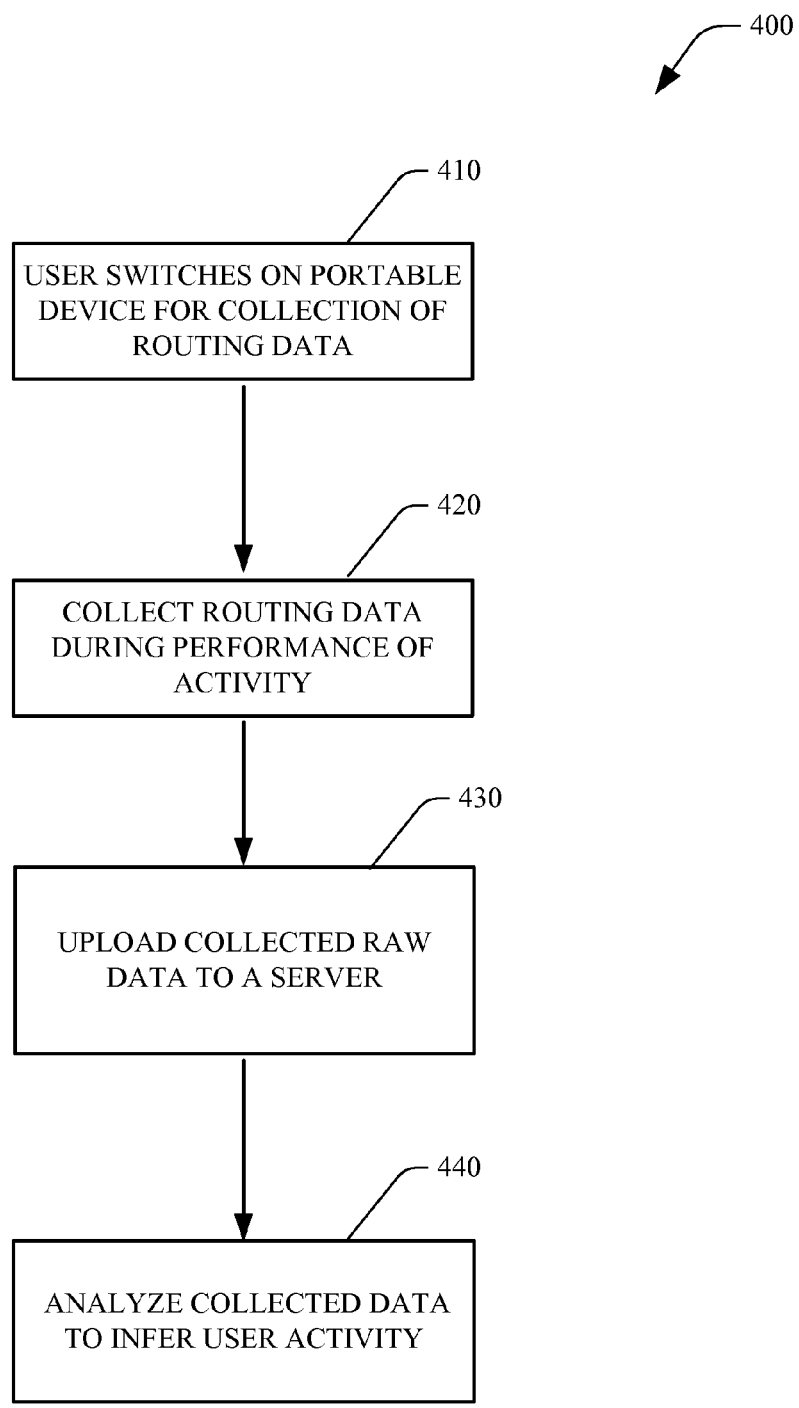
FIG. 4 illustrates a methodology of inferring user activity based on routing data in accordance with an aspect of the subject innovation.

FIG. 4 illustrates a methodology 400 of inferring user activity based on routing data in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410 a user switches on a portable device that can log route data via a positioning system such as a global positioning system. Next, and at 420 the user engages in an activity wherein routing information can be collected throughout performance of the activity. For example, acquiring data can include collection of latitude/longitude/altitude data when the user is engaging in sporting events (e.g., hiking, parachuting, and the like). Additional information such as users' physiological and other biometric data can further be acquired to facilitate subsequent inference for type of activity based on the acquired routing data. At 430, the collected data (e.g., the raw data can be uploaded to a server or to a network. Subsequently, such collected data can be analyzed to infer user activity, at 440. For example, if there is a rapid and substantial decrease in elevation while the longitude and latitude position remains relatively constant, an inference can be made that the user is involved in an activity that requires a quick shift in elevation such as parachuting. Likewise, if there occurs a change in altitude in conjunction with changes in longitude and latitude, an inference can be made that the user is involved in an activity that results in changes in all coordinates such as skiing or biking.

Figure 5:
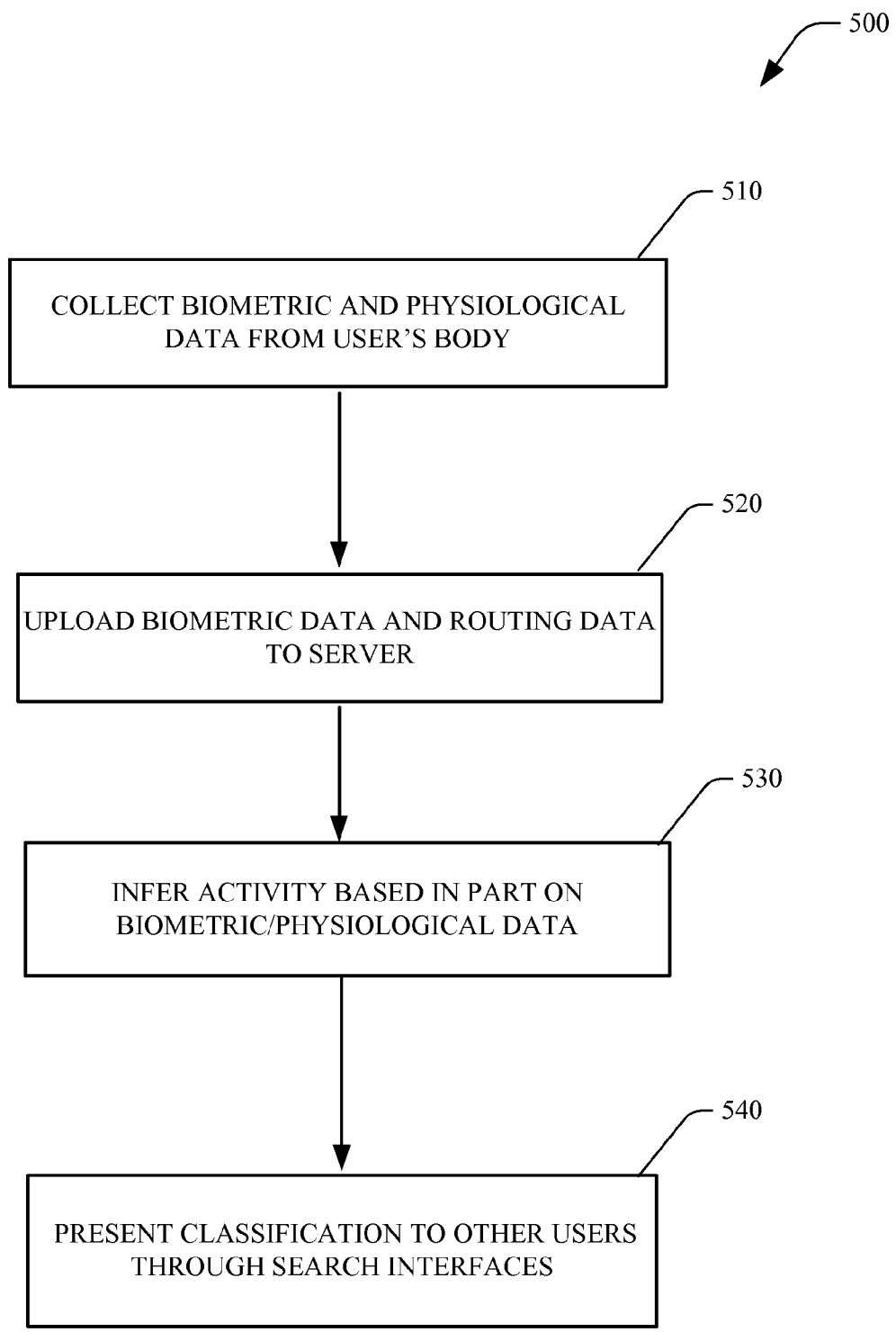
FIG. 5 illustrates a related methodology of inferring user activity in accordance with a particular aspect of the subject innovation.

FIG. 5 illustrates a related methodology 500 of inferring user activity in accordance with a particular aspect of the subject innovation. Initially and at 510, biometric and physiological data can be collected form a body of a user who is engaged in an activity (e.g., collection of pulse rate, blood pressure during sporting engagements). Subsequently and at 520, routing data collected during such activity can be acquired and uploaded with the biometric data to a server. At 530, based on the uploaded biometric data, the server performs an analysis on the routing data. It is to be appreciated that contextual data (e.g., user demographics) current events, calendar, time of day, can further be employed in such analysis. At 540, the inferred activity and classification can be presented to other users who can search such classifications through a plurality of user interfaces. For example, sensors attached to a user's body can capture and continuously sample a range of data about the user and their states such as motion from an accelerometer, contextual variables like altitude and temperature, and biological data such as heart rate. Such inputs can then be processed and automatically integrated into a route document that contains rich information about motion through time and space annotated with a variety of metadata and digital objects. Such route document can inform a user about: stress levels experienced when taking a particular route; potential physical training affects; levels of difficulty as defined base on a predetermined criteria; scenic possibilities and the like.

Figure 6:
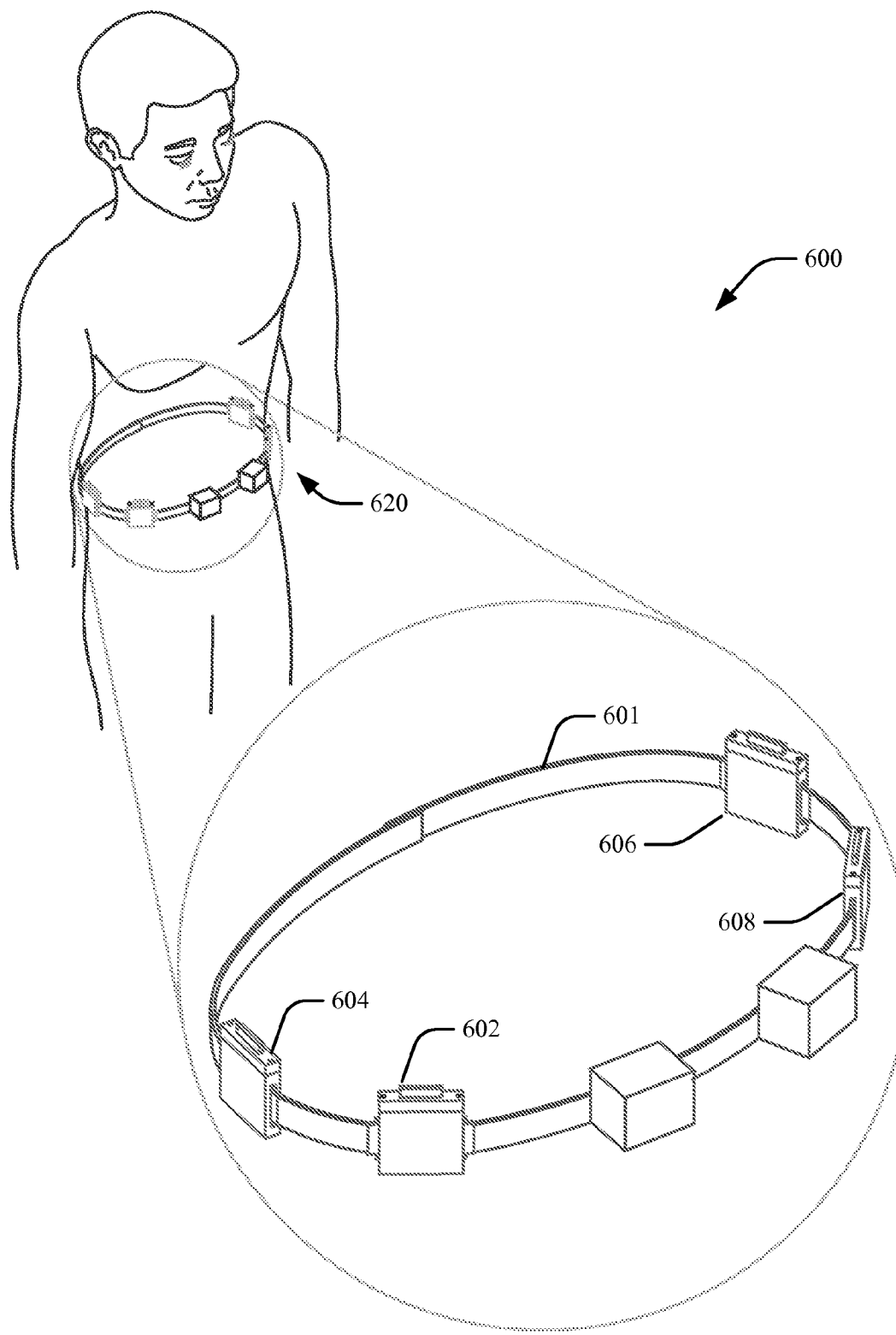
FIG. 6 illustrates an exemplary arrangement of sensors that can be spatially distributed along a communication link around a user's body, to facilitate collection of additional data for inferring users' activities.

FIG. 6 illustrates an exemplary arrangement of sensors 600 that can be spatially distributed along a communication link such as a belt 601 around a user's body. Certain sensor components 602-608 can thus be located proximate to predetermined portions of a user's body 620. Data can be communicated with such sensor components 602-608 over a common communication link, or network, wherein all modules on the network communicate via a standard communications protocol.

The sensor arrangement 600 can include a plurality of sub components that are grouped together 602 (e.g., flash cards, memory cards, communication systems, data acquisition circuitry and the like) as part of a package with an interconnect 606 to a sensor. By replacing, inserting, swapping a sub part, the sensor arrangement 600 can be readily tailored to operate for acquisition of a particular biometric data and/or transmit data based on a particular transmission protocol. For example, the sensor arrangement 600 can be adapted to acquire data related to Electromyography, Electrocardiography, Electroencephalography, blood pressure, and the like, which can be employed to facilitate inference of user activity based on route data.

Figure 7:
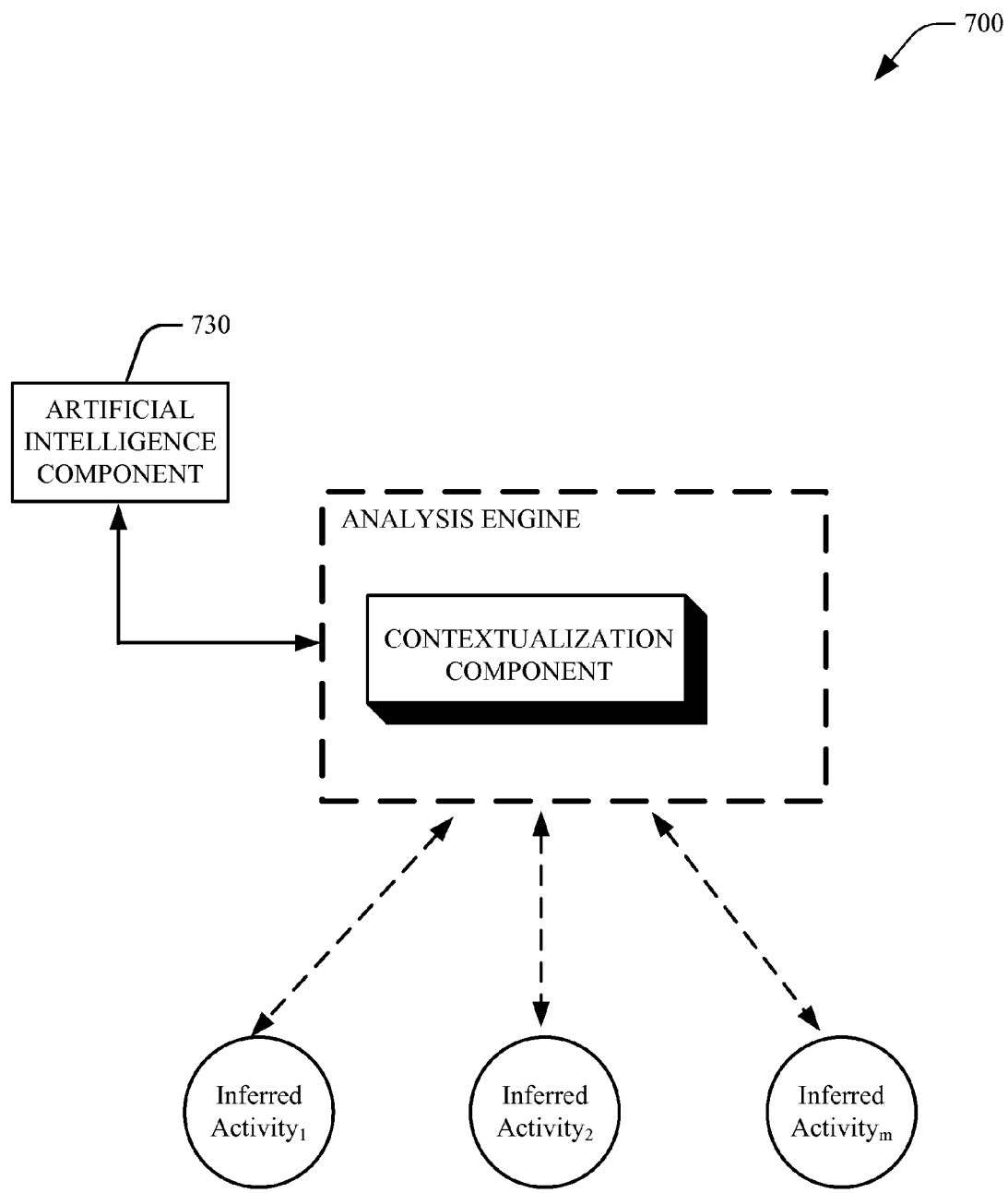
FIG. 7 illustrates an artificial intelligence (AI) component that can be employed to facilitate inferring and/or determining when, where, how to determine a user activity based in part on route data.

FIG. 7 illustrates an artificial intelligence (AI) component 730 that can be employed to facilitate inferring and/or determining when, where, how to determine a user activity based in part on route data. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 730 can employ any of a variety of suitable AI-based schemes as described supra in connection with facilitating various aspects of the herein described invention. For example, a process for learning explicitly or implicitly how or what activity the user has been engaged in can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$.

Figure 8:
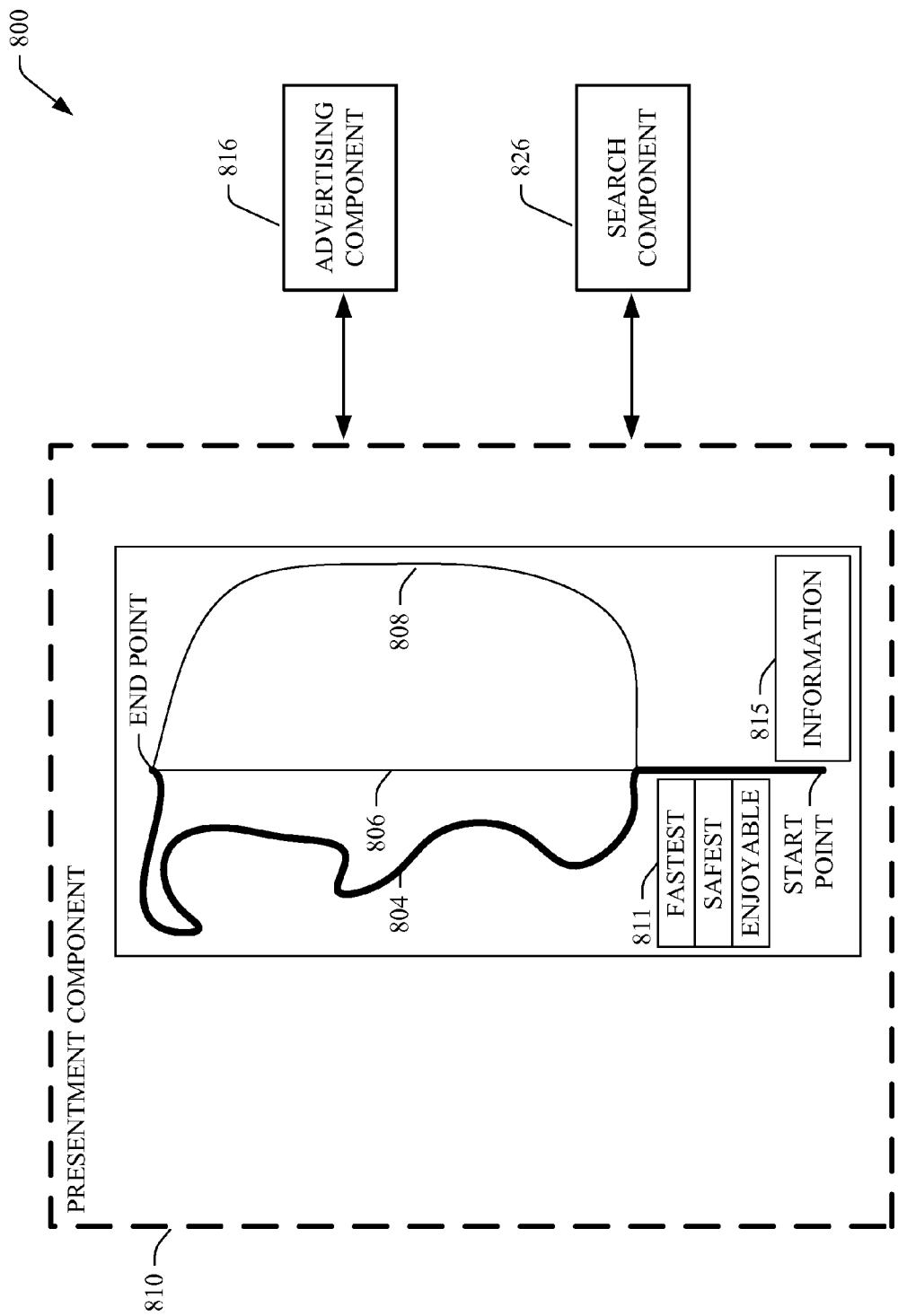
FIG. 8 illustrates a particular user interface in form of a presentment component that supplies a proposed route to a user based on inferred activity from other users.

FIG. 8 illustrates a particular user interface 800 in form of a presentment component 810 that supplies a proposed route to a user based on inferred activity from other users. The presentment component 810 can include a display/video screen, a speaker, a component that transmits information to an auxiliary device (e.g., a cellular telephone), and the like.

The search component 826 enable users to search inferred activities/routes based on criteria that has been employed for the inference/classification (e.g., muscle activity, heart rate, contextual data, and the like.) As explained earlier, the subject innovation can in part employ routing data (e.g., location data collected on users trail that happen to be traversed at different times by users carrying devices that can aid in tracking location, velocity, and the like), to classify and/or infer user activities at different times of day and days of a week to build a model that links sets of contextual and structural information to observations. For instance, information sensed regarding a level that a user exerts oneself to traverse a hiking trail can be employed to initially infer the user activity as hiking and further infer its required level of difficulty.

As illustrated in FIG. 8, the presentation component 810 displays three routes 804, 806, 808 that have been generated based on data collected from a plurality of users. A first route, 804 can be a scenic route with winding turns and a generally strenuous activity that can be inferred to require hiking experience; however, the route takes 30 minutes longer than route 806 and 15 minutes longer then route 808. A second route 806 can be a straight line that has been inferred to have relatively little strenuous physical activity. This can be the fastest and most direct route for users who require relatively low physical activity. A third route can be a side-street route that is faster to travel than route 804 but slower to travel than route 806. In addition, through the button set 811, a user can input preferences regarding the type of route such user desires to take. For example, the user can select the 'fastest' tab of the button set 811.

The different routes 804, 806, 808 can be annotated (offline or in real-time) 811, 815 via the users and be placed within the traffic system representation. Further, a route planning/recommendation can account for user preferences (inferred or explicitly defined) in connection with outputting a route to a user. For example, the user may prefer to travel over country roads rather than freeways, even though traversal of the country roads may not provide a fastest route between two points.

The presentment component 810 can further employ an advertisement component 816 that assists in augmenting route recommendation for activities with proposal information. Proposal information can be commercial (e.g., Eat at Joe's Place) and/or informative (e.g., come to an outdoor club meeting) in nature. Different structures can exist to allow for augmentation. For example, a timing component (not shown) can be employed in order to determine when directions should be augmented with an announcement (e.g., every hour, an advertisement should be placed in a direction set.)

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
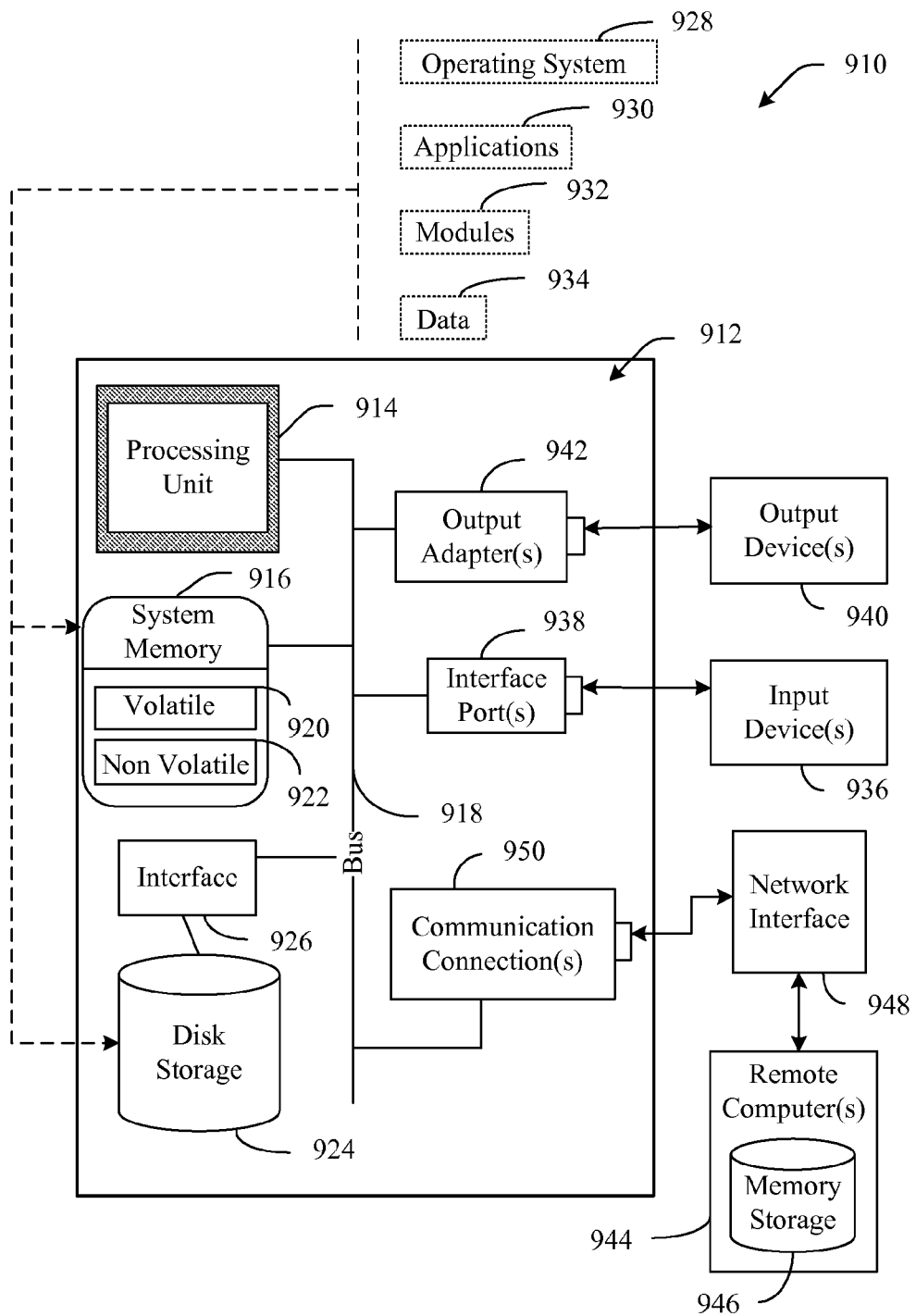
FIG. 9 illustrates an exemplary environment for implementing various aspects of the subject innovation.
Figure 10:
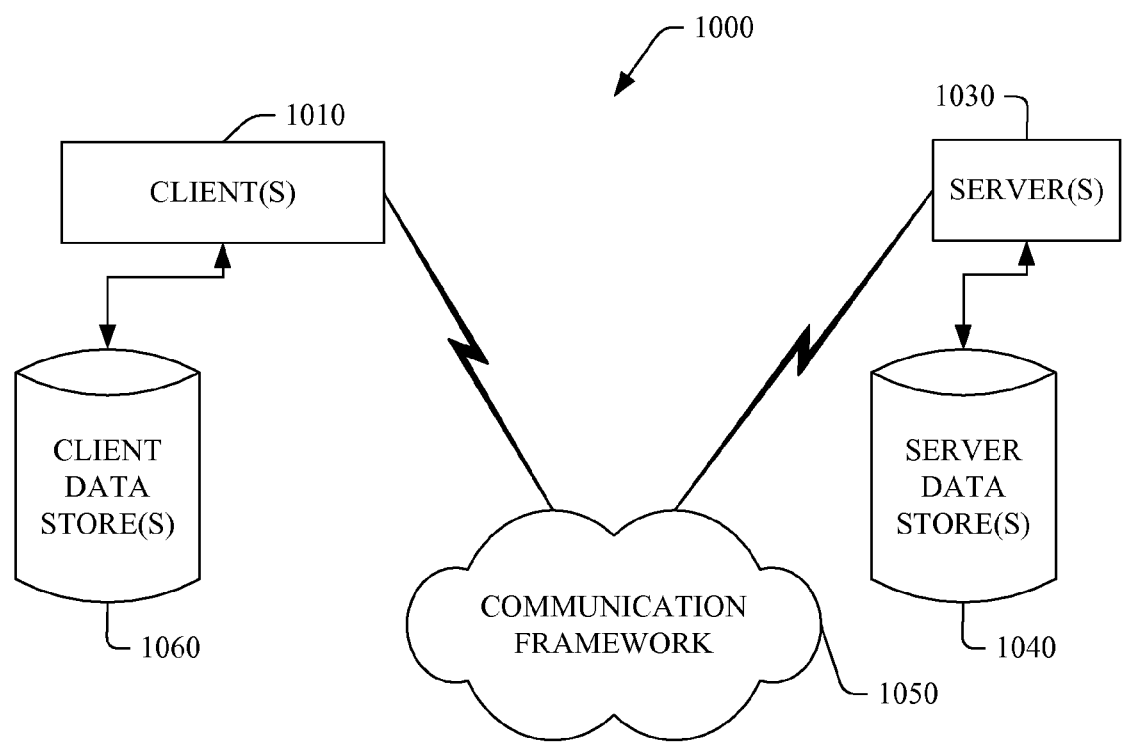
FIG. 10 is a schematic block diagram of a sample-computing environment that can be employed for intelligently downloading digital files.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules.

As used in this application, the terms "component", "system", "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for inferring user activity based on routing data and other contextual information. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising:
    a processor;
    a collection component executable by the processor to receive route data collected during user activities;
    an analysis engine executable by the processor to infer the user activities based in part on the route data;
    a search component executable by the processor to receive a search request to search the route data, the inferred user activities, or a combination thereof; and
    a presentation component executable by the processor to supply a proposed route in response to receiving the search request, wherein the proposed route is based on the route data, the inferred user activities, user preferences, or a combination thereof.

2. The computer implemented system of claim 1 further comprising a classification system executable by the processor to facilitate generation of abstractions regarding collected route data.

3. The computer implemented system of claim 2, the route data includes elevation.

4. The computer implemented system of claim 1 further comprising a contextualization component executable by the processor to facilitate generation of metadata for the route data.

5. The computer implemented system of claim 4, the metadata includes biometric or physiological data or a combination thereof.

6. The computer implemented system of claim 5 wherein the biometric data, the physiological data or the combination thereof is obtained by sensors attachable to a user's body.

7. The computer implemented system of claim 1, wherein the route data is collected by one or more computing devices with GPS capabilities, TDOA capabilities, or a combination thereof.

8. The computer implemented system of claim 1 further comprising an artificial intelligence component executable by the processor to facilitate inference of the user activities.

9. A computer implemented method comprising the following computer executable acts:
    receiving, by a server computer, routing data collected during activities of a plurality of users;
    inferring, by the server computer, the plurality of activities based on the routing data;
    receiving, by the server computer, a request from a computing device of a particular user to search the routing data, the inferred activities of the plurality of users, or a combination thereof; and
    supplying, by the server computer, a proposed route to the computing device, wherein the proposed route is based on the inferred activities of the plurality of users, the routing data, user preferences, or a combination thereof.

10. The computer implemented method of claim 9 further comprising classifying, by the server computer, the activities of the plurality of users based on elevation data.

11. The computer implemented method of claim 9 further comprising receiving, by the server computer, physiological or biometric data from a user's body collected during at least one of the activities.

12. The computer implemented method of claim 9 further comprising employing, the server computer, a probabilistic or a statistical based analysis or a combination thereof to infer the activities of the plurality of users.

13. The computer implemented method of claim 9 further comprising inferring, by the server computer, the activities of the plurality of users based on classifiers.

14. The computer implemented method of claim 9 further comprising searching, by the server computer, for a route based on physiological data.

15. The computer implemented method of claim 9 further comprising receiving, by the server computer, the route data in an XML file.

16. The computer implemented method of claim 9 further comprising annotating, by the server computer, the routing data.

17. A computer implemented system comprising the following computer executable components:

a processor;

means executable by the processor for receiving routing data collected during activities of a plurality of users;

means executable by the processor for inferring the activities of the plurality of users based on the routing data;

means executable by the processor for receiving biological data of at least one user, wherein the biological data is related to one or more of the activities;

means executable by the processor for inferring a level of difficulty of each of the one or more of the activities based on the routing data and the biological data;

means executable by the processor for receiving a request from a computing device of a particular user to search the routing data, the inferred activities of the plurality of users, the biological data, or a combination thereof; and means executable by the processor for supplying a proposed route to the computing device, wherein the proposed route is based on the routing data, the inferred activities of the plurality of users, and the biological data.

* * * * *